US006778345B1

(12) United States Patent
Ozdemir

(10) Patent No.: US 6,778,345 B1
(45) Date of Patent: *Aug. 17, 2004

(54) CIRCUIT AND METHOD FOR CONTROLLING THE GAIN OF AN AMPLIFIER

(75) Inventor: Hakan Ozdemir, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,399

(22) Filed: Feb. 14, 2000

(51) Int. Cl.[7] .............................................. G11B 5/09
(52) U.S. Cl. .......................................... 360/66; 360/67
(58) Field of Search ............................. 360/66, 55, 25, 360/32, 67, 65

(56) References Cited

U.S. PATENT DOCUMENTS

| 4,563,637 A | * | 1/1986 | De Bortoli et al. ...... 324/76.17 |
| 5,034,940 A | * | 7/1991 | Saito et al. ............... 369/44.34 |
| 5,124,967 A | * | 6/1992 | Isaka et al. .................. 369/111 |
| 5,297,184 A | * | 3/1994 | Behrens et al. ............. 375/345 |
| 5,325,394 A | * | 6/1994 | Bruckert ...................... 375/148 |
| 5,343,498 A | * | 8/1994 | Toy et al. .................... 375/259 |
| 5,448,424 A | * | 9/1995 | Hirano et al. .................. 360/65 |
| 5,589,877 A | * | 12/1996 | Ikuzawa et al. ............ 348/186 |
| 5,812,025 A | * | 9/1998 | Shimazaki ................... 330/129 |
| 6,111,710 A | * | 8/2000 | Feyh et al. .................... 360/46 |
| 6,307,696 B1 | * | 10/2001 | Bishop et al. ................. 360/51 |

FOREIGN PATENT DOCUMENTS

JP          01258235 A  * 10/1989  .............. 369/44.11

* cited by examiner

*Primary Examiner*—David Hudspeth
*Assistant Examiner*—Varsha A. Kapadia
(74) *Attorney, Agent, or Firm*—Lisa K. Jorgenson; Bryan A. Santarelli

(57) ABSTRACT

A circuit controls the gain of an amplifier that amplifies an information signal. The circuit includes a buffer that stores two samples of the amplified information signal, and includes a gain-determination circuit coupled to the buffer. The gain-determination circuit generates a gain adjustment that is based on the two samples and that causes the amplifier to shift the amplitude of the amplified information signal to or toward a predetermined amplitude. Such a circuit can provide an initial, coarse gain adjustment to a read-signal amplifier in a disk-drive read channel. Compared to prior read channels, this initial adjustment promotes faster settling of the amplifier gain at the beginning of a data sector. This faster settling allows the data sector to have a shorter preamble, and thus allows the disk to have a higher data-storage density. Furthermore, because the phase angle between the sample clock and the preamble sinusoid may be unknown at the beginning of the data sector, the circuit can determine the initial gain adjustment independent of this phase angle.

36 Claims, 6 Drawing Sheets

CIRCUIT AND METHOD FOR CONTROLLING THE GAIN OF AN AMPLIFIER

CROSS-RELATED PATENT APPLICATIONS

This application is related to U.S. Patent App. entitled CIRCUIT AND METHOD FOR CONTROLLING THE GAIN OF AN AMPLIFIER BASED ON THE SUM OF SAMPLES OF THE AMPLIFIED SIGNAL, U.S. patent application Ser. No. 09/503,949, which has the same filing date as the present application and which is incorporated by reference.

TECHNICAL FIELD OF THE INVENTION

The invention relates generally to electronic circuits, and more particularly to a circuit and method for controlling the gain of an amplifier. In one application, a circuit according to the invention provides an initial gain adjustment to a read-signal amplifier in a disk-drive read channel. This initial adjustment allows the amplifier gain-adjust circuitry to more quickly determine and set the proper amplifier gain at the beginning of a data sector. This faster determination and setting allows a reduction in the length of the data-sector preamble, and thus allows an increase in the data-storage density of the disk. Furthermore, because the phase angle between the sample clock and the preamble sinusoid may be unknown at the beginning of the data sector, the circuit can determine the initial gain adjustment independent of this phase angle.

BACKGROUND OF THE INVENTION

FIG. 1 is a block diagram of a conventional disk-drive read channel 10, which includes a read path 12 and an gain-control circuit 14. The read path 12 includes a disk 16 for storing data, a read head 18 for reading data from the disk 16 and for generating a corresponding read signal, a signal-controlled amplifier 20 for amplifying the read signal, an analog-to-digital (A/D) converter 22 for sampling and digitizing the amplified read signal, a finite-impulse-response (FIR) filter 24 for equalizing the digital samples, and a Viterbi detector 26 for recovering the read data from the equalized samples. Although shown having a single A/D converter 22, the read path 12 may include two or more parallel A/D converters as is well known. The gain-control circuit 14 includes a gain-determination circuit 28 for generating a digital gain-control signal, and a digital-to-analog converter (D/A) 30 for converting the digital gain-control signal into an analog gain-control signal (voltage or current).

FIG. 2 is a diagram of a preamble sinusoid generated by the amplifier 20 of FIG. 1 and having a peak amplitude A. A preamble is a bit pattern that is stored at the beginning of each data sector (not shown) of the disk 16. This bit pattern is designed such that while the read head 18 reads the preamble, the read signal from the head 18 and the amplified read signal from the amplifier 20 are sinusoids or approximate sinusoids. As discussed below, the read channel 10 uses the preamble to calibrate itself in preparation of the head 18 reading the data that follows the preamble. Because the preamble occupies storage locations that could otherwise store data, one usually desires the preamble to be as short as possible. But if the preamble is too short, then the read channel 10 may calibrate itself improperly, and thus may read the stored data inaccurately. Therefore, the calibration time of the read channel 10 typically dictates the minimum length of the preamble.

Referring to FIGS. 1 and 2, the gain-control circuit 14 uses equalized samples of the preamble sinusoid from the FIR filter 24 to calibrate the gain of the amplifier 20. The Viterbi detector 26 is designed to process samples that are within a predetermined range of values, this range including a predetermined maximum value and a predetermined minimum value. Furthermore, the FIR samples of the preamble-sinusoid's positive and negative peaks respectively correspond to maximum and minimum sample values. Therefore, while the head 18 reads the preamble, the gain-control circuit 14 uses feedback—the amplifier 20, A/D 22, FIR 24 and control circuit 14 form a feedback loop—to adjust the gain of the amplifier 20 so that at the output of the FIR 24, the positive-peak and negative-peak samples equal the predetermined maximum and minimum values, respectively, before the head 18 begins reading data.

Unfortunately, the gain-control circuit 14 often limits the storage density of the disk 16. To insure that the gain-adjust feedback loop is stable and can finely tune the gain of the amplifier 20, the circuit 14 typically has a relatively long time constant, i.e., operates relatively slowly. Therefore, the circuit 14 often must process a relatively large number of preamble-peak samples from the FIR 24 before the gain of the amplifier 20 settles to an acceptable level. Consequently, the circuit 14 requires the disk 16 to store a relatively long preamble in each data sector to insure that the amplifier gain settles to an acceptable level before the read head 18 begins reading the data that follows the preamble. Unfortunately, this requirement limits the number of data bits that each data sector can store, and thus limits the total number of data bits that the disk 16 can store.

SUMMARY OF THE INVENTION

In one aspect of the invention, a circuit controls the gain of an amplifier that amplifies an information signal. The circuit includes a buffer that stores two samples of the amplified information signal, and includes a gain-determination circuit coupled to the buffer. The gain-determination circuit generates a gain adjustment that is based on the two samples and that causes the amplifier to shift the amplitude of the amplified information signal to or toward a predetermined amplitude.

Such a circuit can provide an initial, coarse gain adjustment to a read-signal amplifier in a disk-drive read channel. Compared to prior read channels, this initial adjustment promotes faster settling of the amplifier gain at the beginning of a data sector. This faster settling allows the data sector to have a shorter preamble, and thus allows the disk to have a higher data-storage density. Furthermore, because the phase angle between the sample clock and the preamble sinusoid may be unknown at the beginning of the data sector, the circuit can determine the initial gain adjustment independent of this phase angle.

DESCRIPTION OF THE INVENTION

Figure 3:
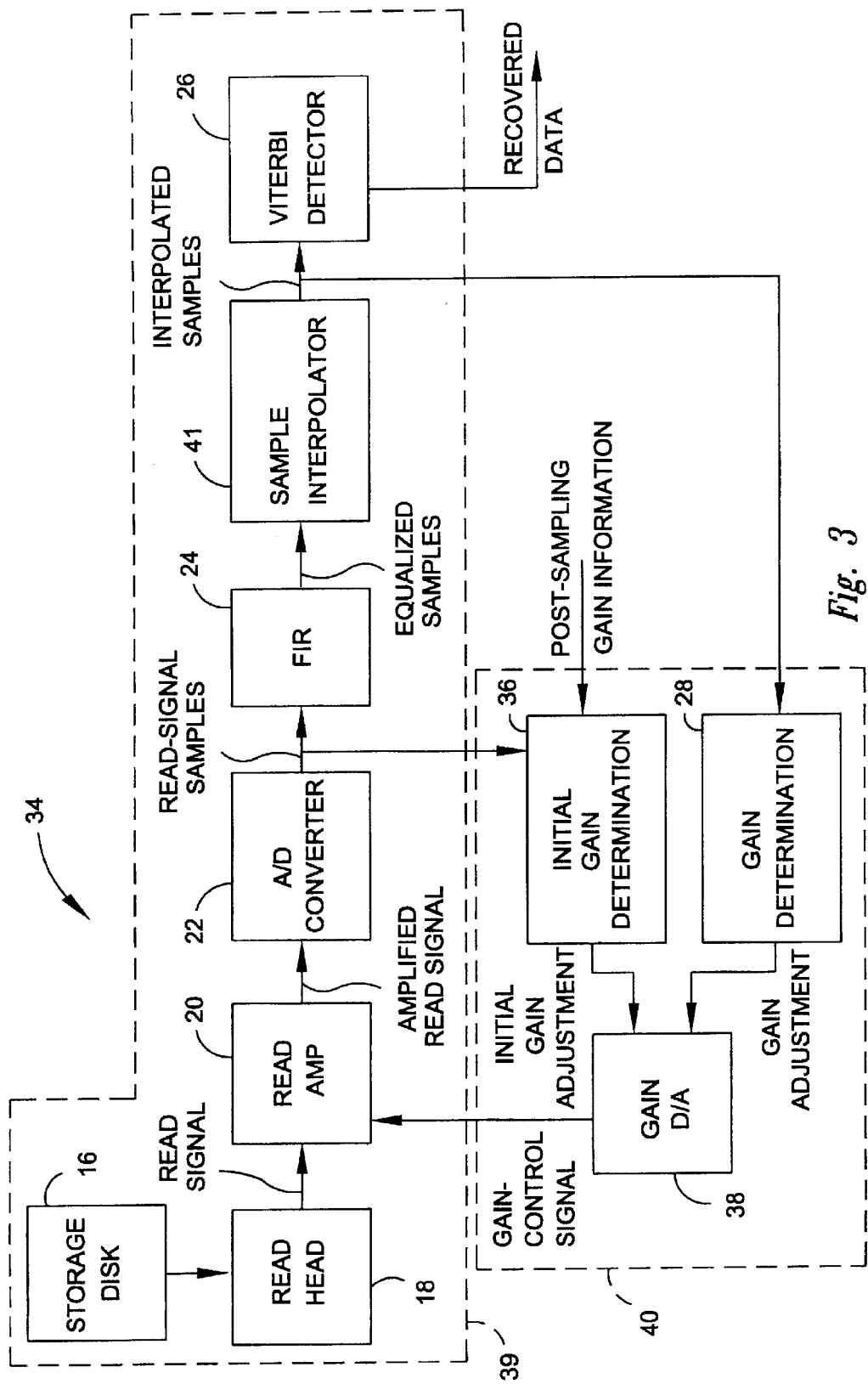
FIG. 3 is a block diagram of a disk-drive read channel according to an embodiment of the invention.

FIG. 3 is a block diagram of a read channel 34 according to an embodiment of the invention. The read channel 34 is similar the to read channel 10 of FIG. 1; therefore, like numerals reference like components in FIGS. 1 and 3. But unlike the read channel 10, the read channel 34 includes an initial-gain-determination circuit 36, which provides an initial, coarse gain adjustment to the read amplifier 20 via a conventional D/A converter 38. Compared to the read channel 10, this initial adjustment promotes faster settling of the amplifier gain at the beginning of each data sector. This faster settling allows each data sector to store a shorter preamble, and thus allows the disk 16 to have a higher data-storage density.

Figure 1:
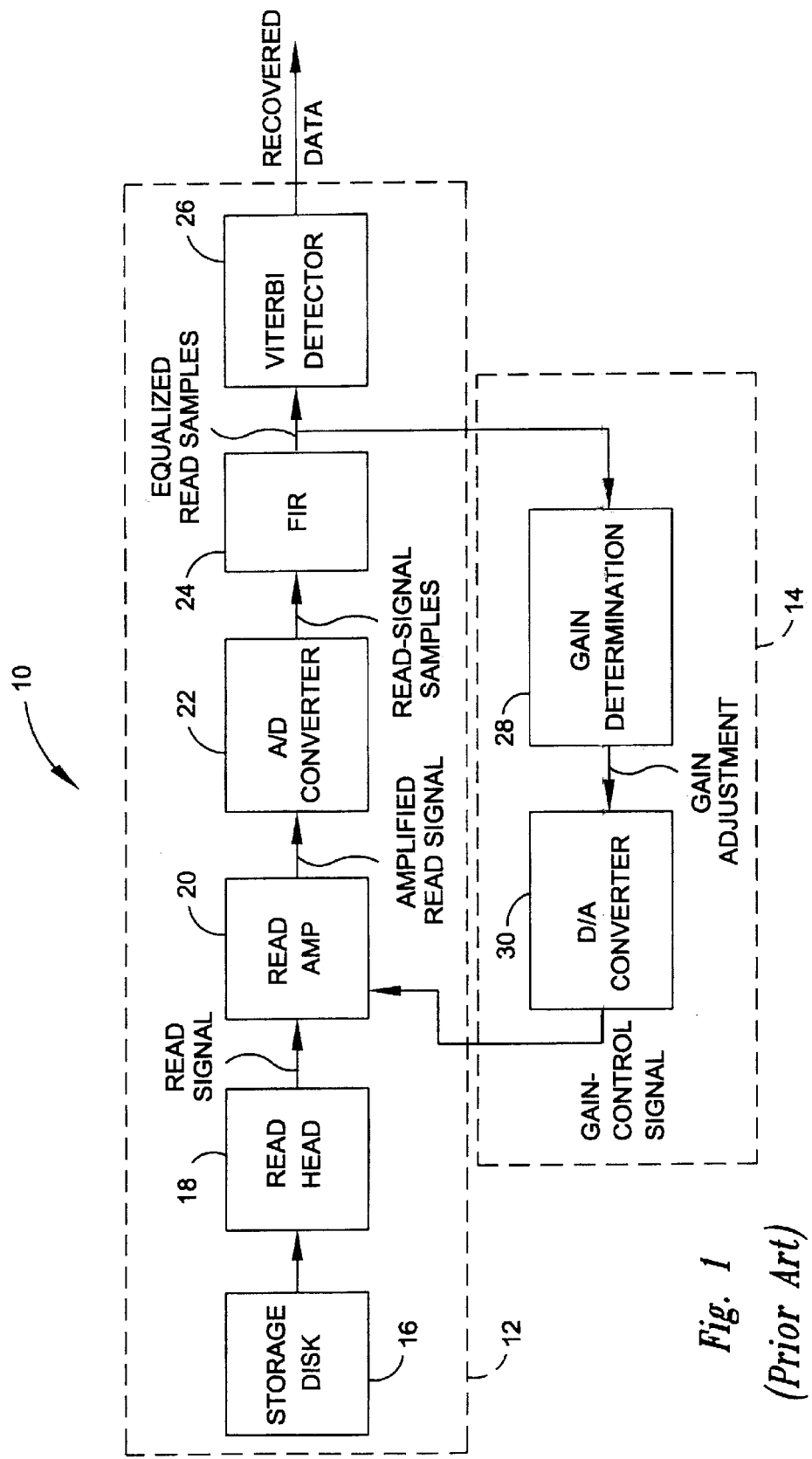
FIG. 1 is a block diagram of a conventional disk-drive read channel.

More specifically, the read channel 34 includes a read path 39, which is similar to the read path 12 of FIG. 1 except that it uses digital timing recovery, and thus includes a sample interpolator 41 coupled between the FIR filter 24 and the Viterbi detector 26. Briefly, digital timing recovery is a technique for determining the phase angle between the A/D sampling clock (not shown) and the read signal. The interpolator 41 adjusts the sample values based on this phase angle. Digital timing recovery and the interpolator 41 are disclosed in more detail in the following references, which are incorporated by reference: U.S. patent application Ser. No. 09/387,146, entitled "Digital Timing Recovery Using Baud Rate Sampling", filed Aug. 31, 1999; U.S. Patent App. entitled "Circuit And Method For Determining The Phase Difference Between A Sample Clock And A Sampled Signal", U.S. patent application Ser. No. 09/503,453, which has the same filing date as the present application; and, U.S. Patent App. entitled "Circuit And Method For Determining The Phase Difference Between A Sample Clock And A Sampled Signal By Linear Approximation", U.S. patent application Ser. No. 09/503,929, which has the same filing date as the present application. The read channel 34 also includes a gain-control circuit 40, which includes the gain circuit 28, the initial-gain circuit 36, and the D/A converter 38 according to an embodiment of the invention.

The gain-determination circuit 28 monitors the samples from the interpolator 41 and sets and maintains the magnitudes of the sample within a desired range by determining and providing one or more fine gain adjustments to the amplifier 20 while the head 18 reads the data portion of the read signal. In some embodiments, the circuit 28 also performs these functions while the head 18 reads the preamble sinusoid.

The initial-gain-determination circuit 36, however, monitors the samples from the A/D 22, and drives the magnitudes of these samples toward or into a desired range by determining and providing an initial, coarse gain adjustment to the amplifier 20 while the head 18 reads the preamble sinusoid. The circuit 36 monitors the A/D samples instead of the interpolated samples because the A/D 22 typically produces samples much sooner than the interpolator 41. Therefore, the circuit 36 can provide the initial gain adjustment more quickly and with a shorter preamble than might otherwise be needed. In one embodiment, the circuit 36 determines the initial gain adjustment independently of the phase between the sample clock (not shown) and the preamble sinusoid. In another embodiment, the circuit 36 provides the initial gain adjustment to the amplifier 20 before the gain circuit 28 provides a fine gain adjustment. In yet another embodiment, the circuit 36 bases its determination of the initial gain adjustment not only on the A/D samples, but also on a gain experienced by the samples within the read path 14 after the samples leave the A/D 22. For example, in one embodiment, the initial gain adjustment accounts for the gain of the FIR filter 24 so as to more accurately set the initial magnitudes of the interpolated samples at the input of the Viterbi detector 26.

The D/A converter 38 converts the fine gain adjustments from the circuit 28 and the coarse gain adjustment from the circuit 34 into respective portions of an analog gain-control signal—voltage or current—which sets the gain of the amplifier 20 to a level corresponding to the respective gain adjustment. In one embodiment, the gain-control signal is logarithmically or otherwise exponentially scaled. In another embodiment, the gain-control signal is linearly scaled. The type of scaling depends on the requirements of the amplifier 20, and the circuits 28 and 36, the converter 38, or other circuits (not shown) can perform the scaling in a conventional manner.

Still referring to FIG. 3, while the read head 18 reads the preamble sinusoid at the beginning of a data sector, the initial-gain-determination circuit 36 determines an initial, coarse gain adjustment based on the magnitudes of the A/D samples, and, in some embodiments, on the expected post-sampling gain within the read path 39. The circuit 36 provides this initial adjustment to the amplifier 20 via the D/A converter 38, and then becomes inactive until the head 18 begins reading the next data sector. This initial adjustment causes the magnitudes of the interpolated samples to move a significant amount towards the desired range, and in some cases into the desired range. Subsequently, the gain circuit 28 becomes active and through a series of fine gain adjustments, causes the magnitudes of the interpolated samples to move into the desired range, and/or to remain within the desired range while the head 18 reads the data in the sector.

Figure 4:
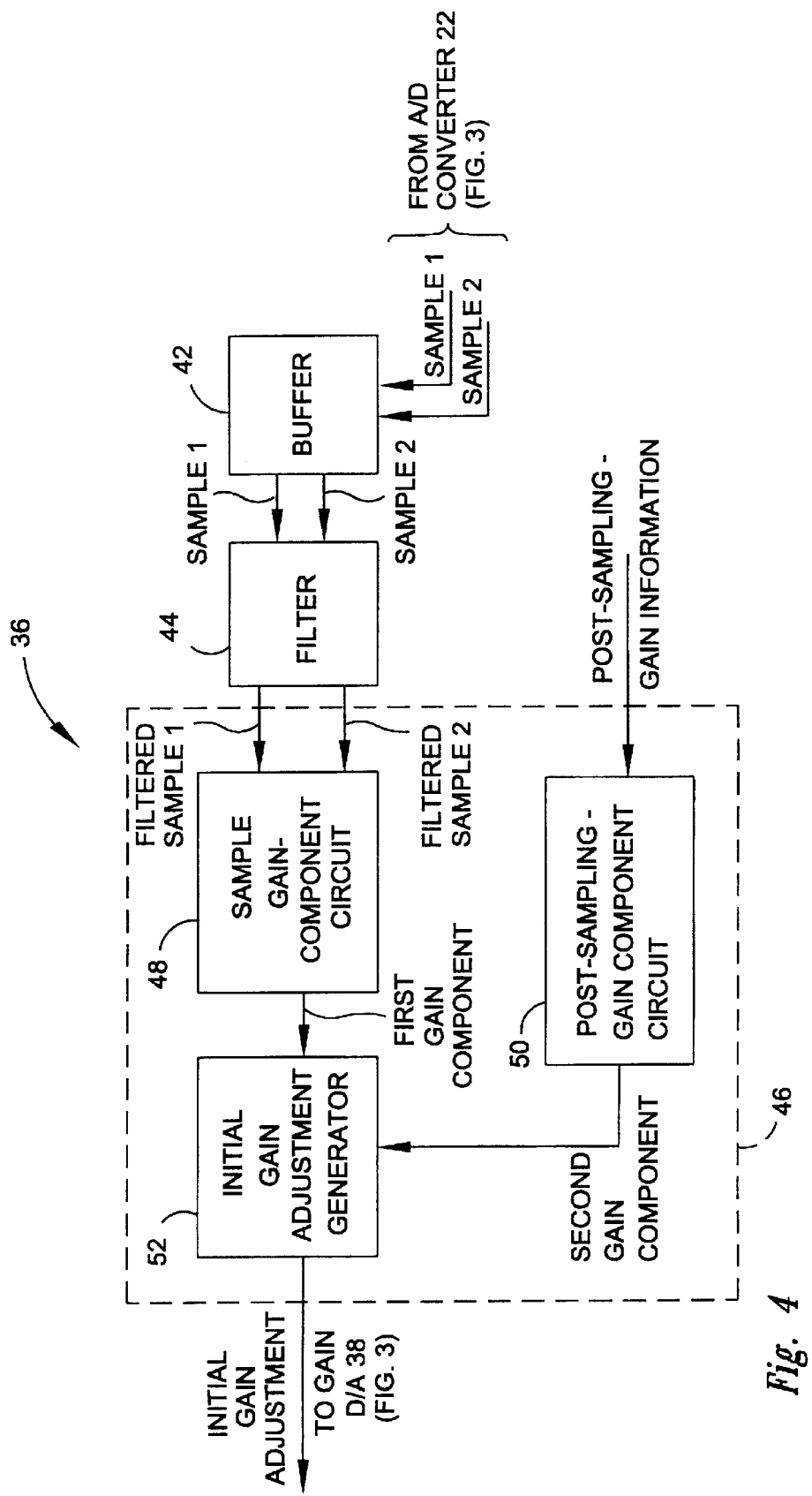
FIG. 4 is a block diagram of the initial-gain-determination circuit of FIG. 3 according to an embodiment of the invention.

FIG. 4 is a block diagram of the initial-gain-determination circuit 36 of FIG. 3 according to an embodiment of the invention. The circuit 36 includes a conventional buffer 42 for receiving and storing samples from the A/D 22 (FIG. 3), a conventional filter 44 for filtering the samples, and an initial-gain-adjustment circuit 46 for determining the initial gain adjustment. The circuit 46 includes a circuit 48 for deriving a first component of the initial gain adjustment from the magnitudes of the preamble-sinusoid A/D samples, a circuit 50 for deriving a second component of the initial gain adjustment from a post-sampling gain experienced by the read signal, and a circuit 52 for generating the initial gain adjustment from the first and second components. In other embodiments, the buffer 42 may be omitted such that the filter 44 receives the samples directly, or both the buffer 42 and the filter 44 may be omitted such that the circuit 46 receives the samples directly. In yet other embodiments, the circuit 46 may perform the buffering or filtering. Furthermore, in some embodiments, the circuit 46 need not consider the post-sampling gain, and thus may omit the circuit 50. In such embodiments the circuit 48 may generate the initial gain adjustment, and thus the generator 52 may also be omitted.

Still referring to FIG. 4, the operation of the circuit 36 and its sub-circuits are now discussed in more detail.

The buffer 42 receives and stores first and second raw samples of the read signal from the A/D 22 (FIG. 3). In one embodiment, the buffer 42 receives eight first raw samples that correspond to eight respective rising edges of the sample clock (not shown), and receives eight second raw samples that correspond to eight respective falling edges of the sample clock. Although described as receiving the first and second raw samples from a single A/D converter 22, the buffer 42 may receive the first raw samples from the A/D converter 22 and receive the second raw samples from a second A/D converter (not shown).

The filter 44 receives the first and second raw samples from the buffer 40 and filters the raw samples to generate a first filtered sample and a second filtered sample. In one embodiment, the filter 44 sets the first filtered sample equal to the average of the first raw samples, and sets the second filtered sample equal to the average of the second raw samples. This averaging typically eliminates most or all of the noise superimposed on the read signal.

The circuit 46 determines the initial gain adjustment based on the magnitudes of the first and second filtered samples. Specifically, the circuit 48 determines the first component of the initial gain adjustment based on what the gain of the amplifier 20 should be changed to given the magnitudes of the first and second filtered samples. The specifics of this determination are discussed below in conjunction with FIGS. 5 and 6. The circuit 50 determines the second component of the initial gain adjustment based on by what factor the first component needs to be scaled to take into account the post-sampling gain. For example, referring to FIG. 3, assume that the desired maximum sample magnitude at the output of the sample interpolator 41 is M, and that the circuit 48 determines that the maximum sample magnitude at the output of the A/D 22 is 2M. Therefore, the circuit 48 generates the first component so as to reduce the gain of the amplifier 20 by one half, so that the maximum sample magnitude at the output of the A/D 22 will thereafter be the desired magnitude M. But the sample magnitudes are altered by the gain of the FIR filter 24 (assume the interpolator 41 has unity gain) before the Viterbi detector 26 receives then. Therefore, in this scenario, the maximum sample magnitude at the input of the Viterbi detector 26 equals M×(FIR Gain). Unless FIR Gain=1, the maximum sample magnitude will not equal M at the input of the Viterbi detector 26. Therefore, the circuit 50 conventionally determines the FIR Gain from the coefficients of the FIR filter 24, and then generates the second gain component so as to reduce the gain of the amplifier by 1/(FIR Gain). Consequently, the circuit 52 generates the initial gain adjustment such that once it causes a corresponding change in the amplifier 20 gain, the maximum sample magnitude at the A/D 22 output equals M/(FIR Gain), and the maximum sample magnitude at the Viterbi detector 26 input equals [M/(FIR Gain)]×(FIR Gain)=M, which is the desired maximum sample magnitude.

Figure 2:
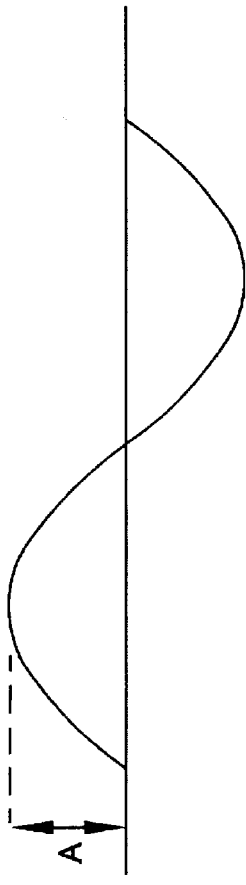
FIG. 2 is a sinusoid generated by the read amplifier of FIG. 1 while reading a preamble of a disk data sector.
Figure 5:
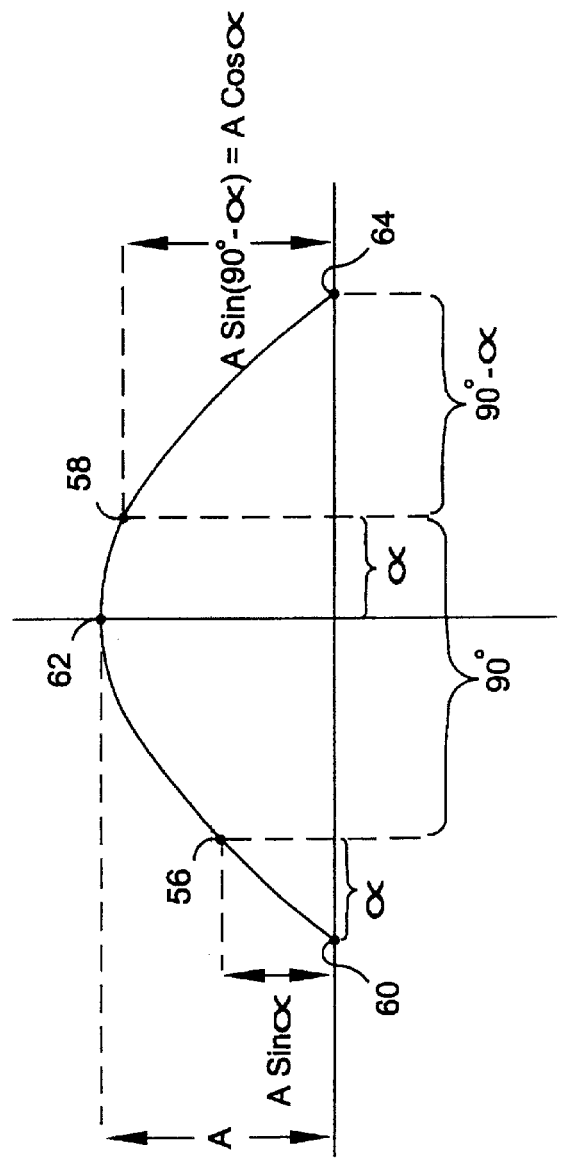
FIG. 5 is a phase diagram of a portion of a preamble sinusoid according to an embodiment of the invention.

FIG. 5 is a phase diagram of a positive half period of the preamble sinusoid of FIG. 2. The diagram shows that if first and second filtered samples 56 and 58 are one quarter period, i.e., 90°, apart—as they typically are in the read channel 39 (FIG. 3)—then the peak amplitude $A^2$=(first filtered sample)$^2$+(second filtered sample)$^2$, and thus A=square root[(first filtered sample)$^2$+(second filtered sample)$^2$]. Specifically, assume that the first sample lags,, a first zero-crossing point 60 by an angle α. Consequently, the magnitude of the first sample 56 equals Asinα. Furthermore, because the first sample 56 leads the second sample 58 by 90°, the second sample 58 lags the peak 62 by α and leads a second zero-crossing point 64 by 90°−α. Therefore, the magnitude of the second sample 58 equals Asin(90°−α)= Acosα. Furthermore, $\sin^2\alpha + \cos^2\alpha = 1$, and thus $A^2\sin^2\alpha + A^2\cos^2\alpha = A^2(\sin^2\alpha + \cos^2\alpha) = A^2$=(first filtered sample 56)$^2$+ (second filtered sample 58)$^2$, and A=square root[(first filtered sample 56)$^2$+(second filtered sample 58)$^2$]. Thus, as long as the first and second filtered samples 56 and 58 are spaced apart by or approximately by 90°, one can calculate the amplitude A from the first and second filtered samples 56 and 68 regardless of where these samples are located on the preamble sinusoid, i.e., regardless of the phase angle between the sample clock (not shown) and the preamble sinusoid.

Referring again to FIG. 4, in one embodiment of the invention the circuit 48 uses the technique described above in conjunction with FIG. 5 to make a phase-independent determination of the first gain component. Because this determination does not depend on the phase between the sample clock and the preamble sinusoid, the circuit 48 can make this determination at the beginning of the preamble, and need not wait for another circuit (not shown) to determine the phase. This allows a shorter preamble than might otherwise be necessary.

Specifically, the circuit 48 determines the maximum, i.e., peak magnitude of the samples as described above in conjunction with FIG. 5. From this peak magnitude, the circuit 48 generates the first component of the initial gain adjustment so as to change the gain of the amplifier 20 such that the peak magnitude at the input to the Viterbi detector 26 (FIG. 3) will thereafter be nearer or equal to the desired peak magnitude as described above. For example, if the desired peak magnitude is M and the determined peak magnitude is 2M, then the circuit 48 generates the first component so that, ignoring the affect of the second component for the moment, it will cut the gain of the amplifier 20 (FIG. 3) in half. Of course, as described above, the circuit 50 generates the second component to scale the affect of the first component by an amount corresponding to a post-sampling gain experienced by the A/D samples.

Figure 6:
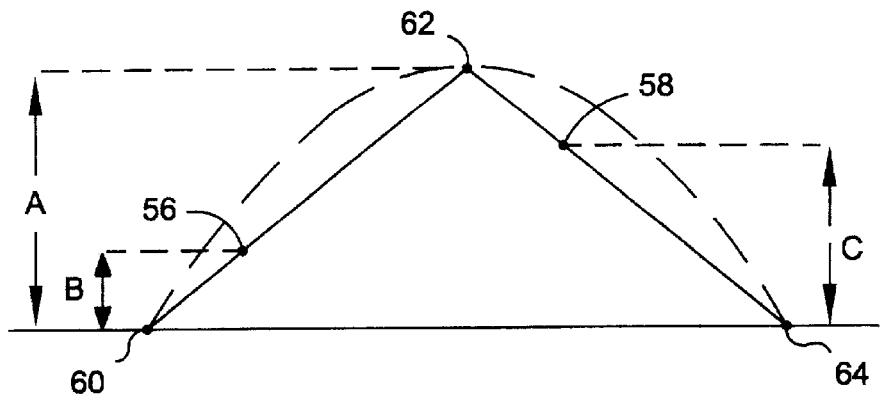
FIG. 6 is a linear approximation of a preamble sinusoid according to an embodiment of the invention.

FIG. 6 is a diagram of a linear approximation of the positive half period portion of the preamble sinusoid shown in FIG. 5. Here, the positive half period of the preamble sinusoid is approximated as a triangle. According to known geometric principles as applied to triangles, if the preamble sinusoid were a triangle wave, then the peak amplitude A=B+C=first filtered sample 56+second filtered sample 58. But because the first and second samples 56 and 58 are points of a sinusoid and not points of a triangle wave, then A≈B+C, and the accuracy of A depends on the phase between the samples 56 and 58, i.e., the sample clock (not shown), and the preamble sinusoid.

Referring again to FIG. 4, in some embodiments, of the invention, the circuit 48 uses the linear-approximation technique described above in conjunction with FIG. 5 to make a determination of the first gain component. In each of these embodiments, once the circuit 48 determines the amplitude A, it generates the first component of the initial gain adjustment in the manner described above in conjunction with FIGS. 4 and 5.

In a first of these embodiments, the circuit 48 merely calculates A=B+C. Although this calculation may be relatively inaccurate, the circuit 48 does not need the phase angle between the sample clock and the preamble sinusoid to make this calculation. Furthermore, even a relatively inaccurate value for A often allows the gain-determination circuit 46 to generate an initial gain adjustment that significantly reduces the gain settling time as compared to generating no initial gain adjustment.

In a second of these embodiments, the circuit 48 scales one or both of the samples 56 and 58 to increase the accuracy of A. For example, in one application, the circuit 48 first determines which of the samples 56 and 58 has the smallest magnitude. If the magnitudes of both samples are equal, then the circuit 48 can select the magnitude of either sample as the smallest. Next, the circuit 48 scales the smallest sample magnitude by a scale factor (2−square root(2))÷(square root (2))=0.414. Then, the circuit 48 calculates the peak magnitude A=(scale factor)×(minimum sample magnitude)+maximum sample magnitude. This specific technique yields an accuracy for A within ±10%, where the accuracy depends on the phase angle between the sample clock and the preamble sinusoid during the time that the A/D 22 generates the samples 56 and 58.

In a third of these embodiments, the circuit 48 scales one or both samples and calculates a raw value for A (Raw_A) according to the technique described above for the second embodiments, and then scales Raw_A with a correction factor CF that is a function of the phase angle between the sample clock and the preamble sinusoid. For example, in one application, a separate phase circuit (not shown) calculates a 5-bit relative phase angle α' between the sample clock and the preamble sinusoid. Examples of such a phase circuit are disclosed in U.S. Patent App. Ser. No. 09/503,453 entitled "Circuit And Method For Determining The Phase Difference Between A Sample Clock And A Sampled Signal", which has the same filing date as the present application; and, U.S. Patent App. Ser. No. 09/503,429 entitled "Circuit And Method For Determining The Phase Difference Between A Sample Clock And A Sampled Signal By Linear Approximation", which has the same filing date as the present application, which are previously incorporated by reference. Table I shows the values of CF and the peak magnitude A for respective ranges of α'.

TABLE I

| α'    | CF   | A = CF × Raw_A  |
|-------|------|-----------------|
| 0–3   | 1.00 | A = Raw_A       |
| 5–13  | 0.95 | A = 0.95Raw_A   |
| 14–18 | 0.90 | A = 0.90Raw_A   |
| 19–28 | 0.95 | A = 0.95Raw_A   |
| 29–31 | 1.00 | A = Raw_A       |

Because the circuit 48 can calculate Raw_A while the phase circuit calculates α', there is little or no time penalty for the circuit 48 calculating the peak magnitude A using this technique, and thus the preamble typically need not be lengthened with respect to the embodiment described above in conjunction with FIG. 5 and the first and second embodiments described above in conjunction with FIG. 6.

Figure 7:
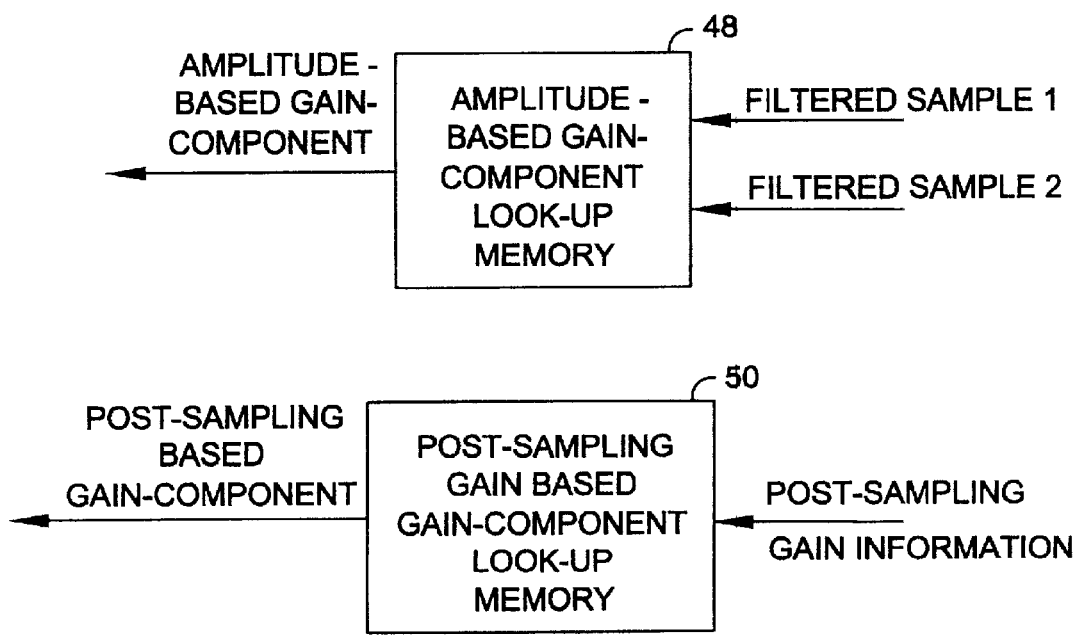
FIG. 7 is a block diagram of look-up memories that respectively compose the amplitude-based and post-sampling-based gain-component circuits of FIG. 4 according to an embodiment of the invention.

FIG. 7 is a block diagram of an alternate embodiment of the circuits 48 and 50 of FIG. 4. In this embodiment, the circuits 48 and 50 each include one or more respective look-up memories. Specifically, the circuit 48 stores a number of values that are predetermined according to one of the calculation techniques described above for the circuit 48. The, circuit 48 then retrieves the one of these values that corresponds to the magnitudes of the first and second filtered samples, and provides this value to the generator 52 (FIG. 4) as the first component of the initial gain adjustment. Similarly, the circuit 50 stores a number of predetermined values respectively corresponding to potential post-sampling gains. The circuit 50 then retrieves the one of these values that corresponds to the received post-sampling gain information, and provides this value to the generator 52 as the second component of the initial gain adjustment. In one application, the circuits 48 and 50 may each partition their look-up memories into respective sections that store intermediate values for respective parts of a calculation, and then calculate the final values from these intermediate values. For example, referring to FIGS. 4 and 5, the circuit 48 may include a first section for storing predetermined values of (first sample $56)^2$, a second section for storing predetermined values of (second sample $58)^2$, and a calculation circuit (not shown) for calculating from these values the first component of the initial gain adjustment.

An advantage of this alternate embodiment is that it is typically faster than the above-described embodiments because the circuits 48 and 50 can retrieve predetermined values from a memory location faster than they can calculate these values. Conversely, a disadvantage of this embodiment is that the size of the look-up memories often renders the circuits 48 and 50 significantly larger than in the above-described embodiments.

Figure 8:
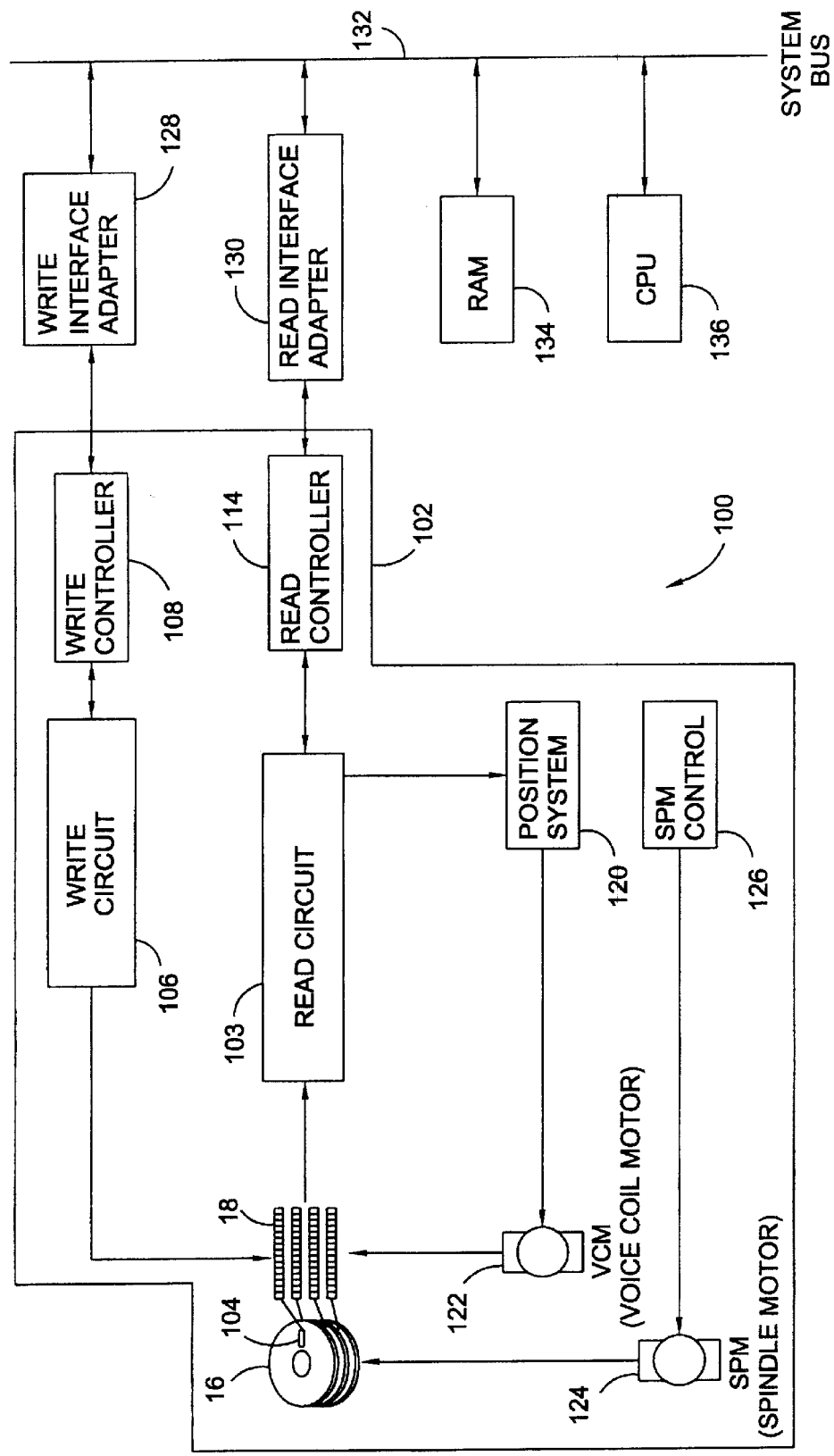
FIG. 8 is a block diagram of a disk-drive system that incorporates a portion of the read channel of FIG. 3 according to an embodiment of the invention.

FIG. 8 is a block diagram of a disk-drive system 100, which includes a disk drive 102, according to an embodiment of the invention. The disk drive 102 incorporates a read circuit 103, which includes the amplifier 20, A/D converter 22, FIR filter 24, sample interpolator 41, Viterbi detector 26, arid gain-control circuit 40 of FIG. 3. The disk drive 102 includes the read head 18, which is typically a combination write/read head, a write circuit 106 for generating and driving the head 104 with a write signal, and a write controller 108 for interfacing the write data to the write circuit 106. The disk drive 102 also includes the read circuit 103 for receiving a read signal from the head 18 and for recovering data from the read signal, and includes a read controller 114 for organizing the read data. The disk drive 102 further includes a storage medium such as one or more of the disks 16, each of which may store data on one or both sides. The read/write head 18 writes/reads the data stored on the disks 16 and is connected to a movable support arm 118. A position system 120 provides a control signal to a voice-coil motor (VCM) 122, which positionally maintains/moves the arm 118 so as to positionally maintain/radially move the head 18 over the desired data on the respective disks 16. A spindle motor (SPM) 124 and a SPM control circuit 126 respectively rotate the disks 16 and maintain them at the proper rotational speed.

The disk-drive system 100 also includes write and read interface adapters 128 and 130 for respectively interfacing the write and read controllers 108 and 114 to a system bus 132, which is specific to the system used. Typical system busses include ISA, PCI, S-Bus, Nu-Bus, etc. The system 100 also typically has other devices, such as a random access memory (RAM) 134 and a central processing unit (CPU) 136 coupled to the bus 132.

From the foregoing it will be appreciated that, although specific embodiments of the invention have been described herein for purposes of illustration, various modifications may be made without deviating from the spirit and scope of the invention. For example, although the circuits of FIGS. 3, 4, and 7 are described as having distinct circuit blocks, the functions of some or all of these blocks may be performed by one or more processors. Furthermore, because one of skill in the art can design specific circuitry or software to perform the above-described functions, the details of this circuitry and software are omitted for clarity.

What is claimed is:

1. A circuit for controlling a gain of an amplifier that is operable to amplify an information signal, the circuit comprising:

an initial-gain-determination circuit operable to generate an initial gain adjustment based on the two samples of the amplified information signal, the gain adjustment operable to cause the amplifier to shift the amplitude of the amplified information signal to or toward a predetermined amplitude; and a tracking gain-determination circuit operable to generate a tracking gain adjustment based on subsequent samples of the amplified information signal, the tracking gain adjustment operable to cause the amplifier to maintain the amplitude of the amplified information signal at or near the predetermined amplitude.

2. A circuit for controlling a gain of an amplifier that is operable to amplify an information signal, the circuit comprising:

a buffer operable to store two samples of the amplified information signal; and a gain-determination circuit coupled to the buffer and operable to generate a gain adjustment based on the two samples, the gain adjustment operable to cause the amplifier to shift the amplitude of the amplified information signal to or toward a predetermined amplitude, the gain-determination circuit comprising, a first gain-component circuit operable to generate a first gain-component signal based on the two samples, a second gain-component circuit operable to generate a second gain-component signal based on a post-sampling gain experienced by the amplified information signal, and a gain-adjustment generator coupled to the first and second gain-component circuits and operable to generate the gain-control signal from the first and second gain-component signals.

3. A circuit for controlling a gain of an amplifier that is operable to amplify an information signal, the circuit comprising:

a buffer operable to store two samples of the amplified information signal; and a gain-determination circuit coupled to the buffer and operable to generate a gain adjustment based on the two samples, the gain adjustment operable to cause the amplifier to shift the amplitude of the amplified information signal to or toward a predetermined amplitude, the gain-determination circuit comprising, a first gain-component look-up memory operable to store first gain-component values and to provide the first gain-component value corresponding to the two samples, a second gain-component look-up memory operable to store second gain-component values and to provide the second gain-component value corresponding to a post-sampling gain experienced by the amplified information signal, and a gain-adjustment generator coupled to the first and second gain-component look-up tables and operable to generate the gain-adjustment from the first and second gain-component values.

4. A circuit for controlling a gain of an amplifier that is operable to amplify an information signal, the circuit comprising:

a buffer operable to store two samples of the amplified information signal;

a gain-determination circuit coupled to the buffer and operable to generate an initial gain adjustment based on the two samples, the gain adjustment operable to cause the amplifier to shift the amplitude of the amplified information signal to or toward a predetermined amplitude;

wherein the gain adjustment comprises a digital signal; and a digital-to-analog converter coupled to the gain-determination circuit and operable to convert the gain adjustment into an analog signal.

5. A circuit for controlling a gain of an amplifier that is operable to amplify an information signal, the circuit comprising:

a filter operable to receive first and second raw samples of the amplified information signal and to generate respective first and second filtered samples therefrom; and a gain-determination circuit coupled to the filter and operable to generate a gain adjustment based on the square root of the sum of the squares of the first and second filtered samples, the gain adjustment operable to change the amplitude of the amplified information signal to or toward a predetermined amplitude.

6. The circuit of claim 5 wherein:

the information signal comprises a periodic signal; and the filter is operable to,
  receive first raw samples that are spaced apart from each other by or approximately by half a period of the amplified information signal,
  receive second raw samples that are spaced apart from each other by or approximately by half a period of the signal and that are respectively spaced apart from the first samples by or approximately by a quarter period of the signal,
  generate the first filtered sample equal to an average of the first raw samples, and
  generate the second filtered sample equal to an average of second raw samples.

7. The circuit of claim 5 wherein the gain adjustment is proportional to the ratio of the predetermined amplitude to the square root of the sum of the squares of the first and second filtered samples.

8. The circuit of claim 5 wherein the gain-determination circuit comprises:

a first gain-component circuit operable to generate a first gain-component signal based on the square root of the sum of the squares of the first and second filtered samples;

a second gain-component circuit operable to generate a second gain-component signal based on a post-sampling gain experienced by the amplified information signal; and a gain-adjustment generator coupled to the first and second gain-component circuits and operable to generate the gain adjustment from the first and second gain-component signals.

9. The circuit of claim 5 wherein the gain-determination circuit comprises:

a first gain-component look-up memory operable to store first gain-component values and to provide a stored first gain-component value corresponding to the square root of the sum of the squares of the first and second filtered samples;

a second gain-component look-up memory operable to store second gain-component values and to provide a stored second gain-component value corresponding to a post-sampling gain experienced by the amplified information signal; and a gain-adjustment generator coupled to the first and second gain-component look-up tables and operable to generate the gain adjustment from the first and second gain-component values.

10. The circuit of claim 5 wherein the gain-determination circuit is operable to logarithmically scale the gain adjustment.

11. The circuit of claim 5 wherein the gain-determination circuit is operable to linearly scale the gain adjustment.

12. The circuit of claim 5 wherein:
the information signal comprises a periodic signal; and
wherein the first filtered sample leads the second filtered sample by or approximately by 90° of the periodic signal.

13. A read circuit, comprising:
an amplifier having an adjustable gain and operable to receive and amplify a read signal having a preamble portion and a data portion;
an analog-to-digital converter coupled to the amplifier operable to generate samples of the amplified read signal;
a first gain-determination circuit coupled to the amplifier and to the converter and operable to control the gain of the amplifier during the data portion of the read signal; and
a second gain-determination circuit coupled to the amplifier and to the converter and operable to initialize the gain of the amplifier during the preamble portion of the read signal in response to samples from the analog-to-digital converter.

14. The read circuit of claim 13 wherein the second gain-determination circuit is operable to initialize the gain of the amplifier before the first gain-determination circuit controls the gain.

15. The read circuit of claim 13 wherein the second gain circuit is operable to provide a coarse initialization of the amplifier gain before the first gain circuit controls the amplifier gain.

16. The read circuit of claim 13, further comprising:
a finite-impulse-response filter coupled to the converter, having a gain, and operable to process the samples of the read signal; and
wherein the second gain-determination circuit is operable to initialize the gain of the amplifier based on the values of the samples and the gain of the filter.

17. The read circuit of claim 13 wherein the second gain-determination circuit is operable to control the gain of the amplifier based on the square root of the sum of the squares of two consecutive samples of the read signal.

18. A disk-drive system, comprising:
a data-storage disk having a surface and operable to store a preamble and data values;
a motor coupled to and operable to rotate the disk;
a read head operable to generate a read signal that includes the preamble followed by the data values;
a read-head positioning assembly operable to move the read head over the surface of the disk; and
a read circuit coupled to the read head, the read circuit comprising,
an amplifier having an adjustable gain and operable to amplify the read signal,
an analog-to-digital converter coupled to the amplifier and operable to generate samples of the amplified read signal,
a first gain-determination circuit coupled to the amplifier and to the converter and operable to control the gain of the amplifier during the data portion of the read signal, and
a second gain-determination circuit coupled to the amplifier and to the converter and operable to initialize the gain of the amplifier during the preamble portion of the read signal in response to samples from the analog-to-digital converter.

19. A method, comprising:
generating two samples of a signal having an amplitude;
determining the square root of sum of the squares of the samples;
controlling the amplitude of the signal during a first time period in response to the determined square root;
generating subsequent samples of the signal; and
maintaining the amplitude of the signal at or near a predetermined value during a second time period in response to a function of the subsequent samples other than the square root of the sum of the squares.

20. The method of claim 19 wherein the controlling further comprises driving the amplitude of the signal to or toward the predetermined value.

21. The method of claim 19, further comprising:
interpolating the subsequent samples of the signal; and
wherein maintaining the amplitude of the signal comprises maintaining the amplitude of the signal at or near the predetermined amplitude in response to a function of the interpolated samples.

22. A method, comprising:
generating two samples of a signal having an amplitude;
determining the square root of sum of the squares of the samples;
controlling the amplitude of the signal in response to the determined square root; and
wherein the controlling further comprises driving the amplitude of the signal to or toward a predetermined value based on a post-sampling gain experienced by the signal.

23. A method, comprising:
generating two samples of a preamble portion of a read signal having an amplitude;
retrieving an initial gain value from a look-up memory, the gain value corresponding to the two samples; and
providing the initial gain value to an amplifier that amplifies the read signal.

24. A method, comprising:
generating two samples of a preamble portion of a read signal having an amplitude;
determining the square root of sum of the squares of the samples; and
controlling the amplitude of the read signal in response to the determined square root.

25. A method, comprising:
generating first and second samples of a preamble portion of a signal having an amplitude;
controlling the amplitude of the signal during a first time period in response to the square root of the sum of the squares of the first and second samples;
generating subsequent samples of a data portion of the signal; and
controlling the amplitude of the signal during a second time period in response to the subsequent samples.

26. The method of claim 25 wherein controlling the amplitude during the first and second time periods comprises changing the amplitude of the signal to or toward a predetermined amplitude.

27. The method of claim 25, further comprising:
receiving first raw samples that are spaced apart from each other by or approximately by half a period of the signal;
receiving second raw samples that are spaced apart from each other by or approximately by half a period of the signal and that are respectively spaced apart from the first raw samples by or approximately by a quarter period of the signal;
generating the first sample equal to an average of the first raw samples; and
generating the second sample equal to an average of the second raw samples.

28. The method of claim 25 wherein controlling the amplitude of the signal during the first time period further comprises controlling the amplitude of the signal in response to a predetermined amplitude change applied to the signal post-sampling.

29. The method of claim 25 wherein controlling the amplitude of the signal during the first time period comprises:
retrieving from a memory a value that corresponds to the square root of the sum of the squares of the first and second samples; and
controlling the amplitude of the signal in response to the retrieved value.

30. The method of claim 25 wherein controlling the amplitude of the signal during the first and second time periods comprises exponentially controlling the amplitude of the signal.

31. The method of claim 25 wherein controlling the amplitude of the signal during the first and second time periods comprises linearly controlling the amplitude of the signal.

32. The method of claim 25 wherein:
the signal has a period; and
the generating the first and second samples comprises generating the first sample one fourth or approximately one fourth of the period before generating the second sample.

33. A circuit for controlling a gain of an amplifier that is operable to amplify an information signal, the circuit comprising:
a buffer operable to store two samples of the amplified information signal, each of the samples representing preamble information;
an initial-gain-determination circuit coupled to the buffer and operable to generate an initial gain adjustment based on the two samples, the initial gain adjustment operable to cause the amplifier to shift the amplitude of the amplified information signal to or toward a predetermined amplitude; and
a tracking-gain-determination circuit operable to generate a tracking gain adjustment based on subsequent samples of the amplified information signal, each of the subsequent samples representing data, the tracking gain adjustment operable to cause the amplifier to maintain the amplitude of the amplified information signal at or near the predetermined amplitude.

34. A circuit for controlling a grain of an amplifier that is operable to amplify an information signal, the circuit comprising:
a buffer operable to store two samples of the amplified information signal, each of the samples representing preamble information;
a gain-determination circuit coupled to the buffer and operable to generate an initial gain adjustment based on the two samples, the gain adjustment operable to cause the amplifier to shift the amplitude of the amplified information signal to or toward a predetermined amplitude; and
wherein the gain-determination circuit comprises,
a first gain-component circuit operable to generate a first gain-component signal based on the two samples,
a second gain-component circuit operable to generate a second gain-component signal based on a post-sampling gain experienced by the amplified information signals, and
a gain-adjustment generator coupled to the firs,t and second gain-component circuits and operable to generate the gain-control signal from the first and second gain-component signals.

35. A circuit for controlling a gain of an amplifier that is operable to amplify an information signal, the circuit comprising:
a buffer operable to store two samples of the amplified information signal, each of the samples representing preamble information;
a gain-determination circuit coupled to the buffer and operable to generate an initial gain adjustment based on the two samples, the gain adjustment operable to cause the amplifier to shift the amplitude of the amplified information signal to or toward a predetermined amplitude;
wherein the gain-determination circuit comprises,
a first gain-component look-up memory operable to store first gain-component values and to provide the first gain-component value corresponding to the two samples,
a second gain-component look-up memory operable to store second gain-component values and to provide the second gain-component value corresponding to a post-sampling gain experienced by the amplified information signal, and
a gain-adjustment generator coupled to the first and second gain-component look-up tables and operable to generate the gain-adjustment from the first and second gain-component values.

36. The circuit of claim 33, further comprising:
wherein the initial gain adjustment comprises a digital signal; and
a digital-to-analog converter coupled to the gain-determination circuit and operable to convert the initial gain adjustment into an analog signal.

* * * * *